US005420391A

United States Patent [19]

Delcea

[11] Patent Number: 5,420,391

[45] Date of Patent: May 30, 1995

[54] PLASMA TORCH WITH AXIAL INJECTION OF FEEDSTOCK

[75] Inventor: Lucian B. Delcea, Richmond, Canada

[73] Assignee: Metcon Services Ltd., Abbotsford, Canada

[21] Appl. No.: 262,570

[22] Filed: Jun. 20, 1994

[51] Int. Cl.$^{6}$ ................................ B23K 10/00

[52] U.S. Cl. ........................ 219/121.47; 219/121.51; 219/121.48; 219/76.16; 427/446

[58] Field of Search ........................ 219/121.51, 121.48, 219/121.47, 121.52, 121.5, 74, 75, 76.16, 76.11; 427/99, 569, 535, 446, 447, 449

[56] References Cited

U.S. PATENT DOCUMENTS

| | | | |
|---|---|---|---|
| 3,272,962 | 9/1966 | Mauskapf | 219/137 |
| 4,095,081 | 6/1978 | Ashman | 219/76.17 |
| 4,321,454 | 3/1982 | Willens et al. | 219/121.47 |
| 4,780,591 | 10/1988 | Bernecki et al. | 219/121.52 |
| 4,982,067 | 1/1991 | Marantz et al. . | |
| 5,008,511 | 4/1991 | Ross . | |
| 5,144,110 | 9/1992 | Marantz et al. | 219/121.48 |
| 5,298,714 | 3/1994 | Szente et al. | 219/121.47 |
| 5,332,885 | 7/1994 | Lardes | 219/121.47 |

*Primary Examiner*—Mark H. Paschall

*Attorney, Agent, or Firm*—Bull, Housser & Tupper

[57] ABSTRACT

A plasma torch incorporating an arc forming a chamber in which a cathode cooperates with an anode to form a plasma arc. A splitter is connected to the arc forming chamber and comprises a plurality of passages arranged about a core region, the passages leading from the arc forming chamber into a nozzle passage extending along the axis of the arc forming chamber. A feed passage passes through the core region, opening co-axially with the longitudinal axis of the torch, in or about the region of coalescence of the plasma stream exiting the splitter passages. Feedstock material, such as powder, is fed through the feed passage into the coalesced plasma stream in an axial direction and in its direction of travel.

38 Claims, 4 Drawing Sheets

PLASMA TORCH WITH AXIAL INJECTION OF FEEDSTOCK

FIELD OF THE INVENTION

This invention relates to a plasma torch for forming a plasma stream and, more particularly, relates to a plasma torch having a single arc generating component and wherein feedstock is fed axially into the plasma stream.

BACKGROUND OF THE INVENTION

Plasma torches are a source of high temperature, high velocity gas, and are currently used in many applications, including plasma spraying, powder manufacture, materials processing, spray forming, cutting or heat processing. Plasma spraying is used to spray a coating of feedstock onto a metal, ceramic or other substrate material, in order to cause the feedstock to become adhered to the substrate as a thin coating on the substrate. A plasma stream is generated by an arc formed between a cathode and an anode in spaced apart relationship within a chamber. The forming of the are and the consequent generation of the plasma stream are usually done in inert gases, such as argon, to avoid corrosion and other deterioration of the cathode electrode. Secondary gases, such as hydrogen, nitrogen or helium, may be added to the plasma gas in order to increase plasma heat content and thermal conductivity.

Feedstock is injected into the plasma stream causing the feedstock to melt and become propelled by the plasma stream out of the plasma torch onto the substrate material. Existing plasma torches generally provide for feedstock injection into the plasma stream in a direction radial or perpendicular to that stream. The feedstock passage opens perpendicularly into the plasma chamber and feedstock is carded laterally into the stream by means of a carrier gas. Preferably, the feedstock injection takes place downstream from the are forming chamber, generally in the proximity of the plasma torch exit nozzle.

The radial injection of feedstock suffers from several disadvantages. The main disadvantage is the effect of particle segregation of the feedstock between the point of injection into the plasma stream and the deposit surface. This results in non-uniform particle temperature and velocity distribution and divergent particle trajectory which has a negative effect on coating properties and deposition efficiency. These deleterious effects can be avoided when feedstock is fed centrally, or axially, into the axis of a plasma stream in the direction of stream flow, resulting in less divergent particle trajectories and velocities and more uniform heat transfer.

Much of the prior art directed to axial injection of feedstock into a plasma stream provides for multiple systems incorporating a plurality of plasma generators disposed symmetrically about a common axis. Feedstock is injected into the resultant combined stream at or near the area where the streams are brought together. A plurality of independent plasma streams are formed and brought together along the common axis. Examples are found in U.S. Pat. No. 4,982,067 of Marantz, et al and U.S. Pat. No. 5,008,511 of Ross.

The Marantz, et al patent provides a plurality of generated plasma arcs which coalesce toward a common anode electrode. A nozzle injects feedstock and a secondary gas axially into the coalesced plasma stream. The feedstock is injected prior to the anodic electrode attachment which may result in particle overheating and premature melting through direct interaction with a highly ionized plasma are. This is undesirable and can result in deposit of feedstock particles on components of the plasma torch, rather than ejection and deposit on the substrate surface.

The Ross patent also provides a plurality of plasma generators arranged symmetrically about a common axis. A plurality of independent plasma streams are generated and directed into a common region of convergence downstream of the anode. Feedstock is fed axially into the resultant coalescent plasma stream in the region of convergence.

These kinds of axial feed plasma torches all rely on several independent plasma generating sources which results in a high degree of complexity and cost of manufacture and operation. As well, it is common for arcs which are generated by multiple electrode systems to be of differing magnitude forming plasma streams of differing velocity and intensity. When these irregular plasma streams are brought together, difficulties in achieving an axially uniform coalescence of the separate streams into one stream may occur. As well, an irregular united stream results in increased radial drag which causes feedstock particulates to deviate from an axial direction and deposit on components of the plasma torch or travel outside the main plasma stream, thus receiving insufficient heat.

SUMMARY OF THE INVENTION

The present invention provides a plasma torch having a longitudinal axis with a chamber and a plasma generator having a cathode and an anode disposed in the chamber for forming an electrical are to generate a plasma stream in the chamber moving in the direction of the anode. A splitting channel is connected to the chamber, shaped to receive the plasma stream and direct the stream into a plurality of streams. A core region is located in an interior region of, and is substantially surrounded by, the splitting channel. A converging section connected to the splitting channel is shaped to merge the plurality of streams into a generally unitary stream. A feedstock input passage is connected to the converging section and directs feedstock into the unitary stream in the converging section in a direction co-axial with the longitudinal axis of the torch. The feedstock input passage passes through the core region.

Alternatively, a converging channel may be included, located between the splitting channel and the converging section; the core being located in an interior region of, and substantially surrounded by, the splitting channel and the converging channel. The converging channel is shaped to receive the plurality of streams and direct the plurality of streams inwardly towards the converging section.

The splitting channel may be shaped to direct the plasma stream outwardly from the longitudinal axis of the torch and the converging channel may be shaped to direct the plurality of streams inwardly toward the longitudinal axis of the torch.

The torch may include an annular protrusion extending laterally into the chamber to form a narrower opening region in the chamber. The angle between the chamber wall and the protrusion wall may be between 30° and 60° and, preferably, about 45°.

In an alternate embodiment, the invention relates to a feedstock injector for a plasma torch having a splitting channel for connection to a plasma torch shaped to receive a plasma stream from the plasma torch and to direct the stream into a plurality of streams. A core region is located in an interior region of, and is substantially surrounded by, the splitting channel. A converging section is connected to the splitting channel and is shaped to merge the plurality of streams into a generally unitary stream. A feedstock input passage is connected to the converging region for directing feedstock into the unitary stream in the converging region in a direction co-axial with the longitudinal axis of the torch, the passage passing through the core region. The injector may comprise a converging channel located between the splitting channel and the converging section with the core located in an interior region of, and substantially surrounded by, the splitting channel and the converging channel. The converging channel is shaped to receive the plurality of streams and to direct the plurality of streams inwardly toward the converging section.

BRIEF DESCRIPTION OF THE DRAWINGS

Further features and advantages will be evident from the following detailed description of the preferred embodiments of the present invention and in conjunction with the accompanying drawings, in which.

DETAILED DESCRIPTION

Figure 1:
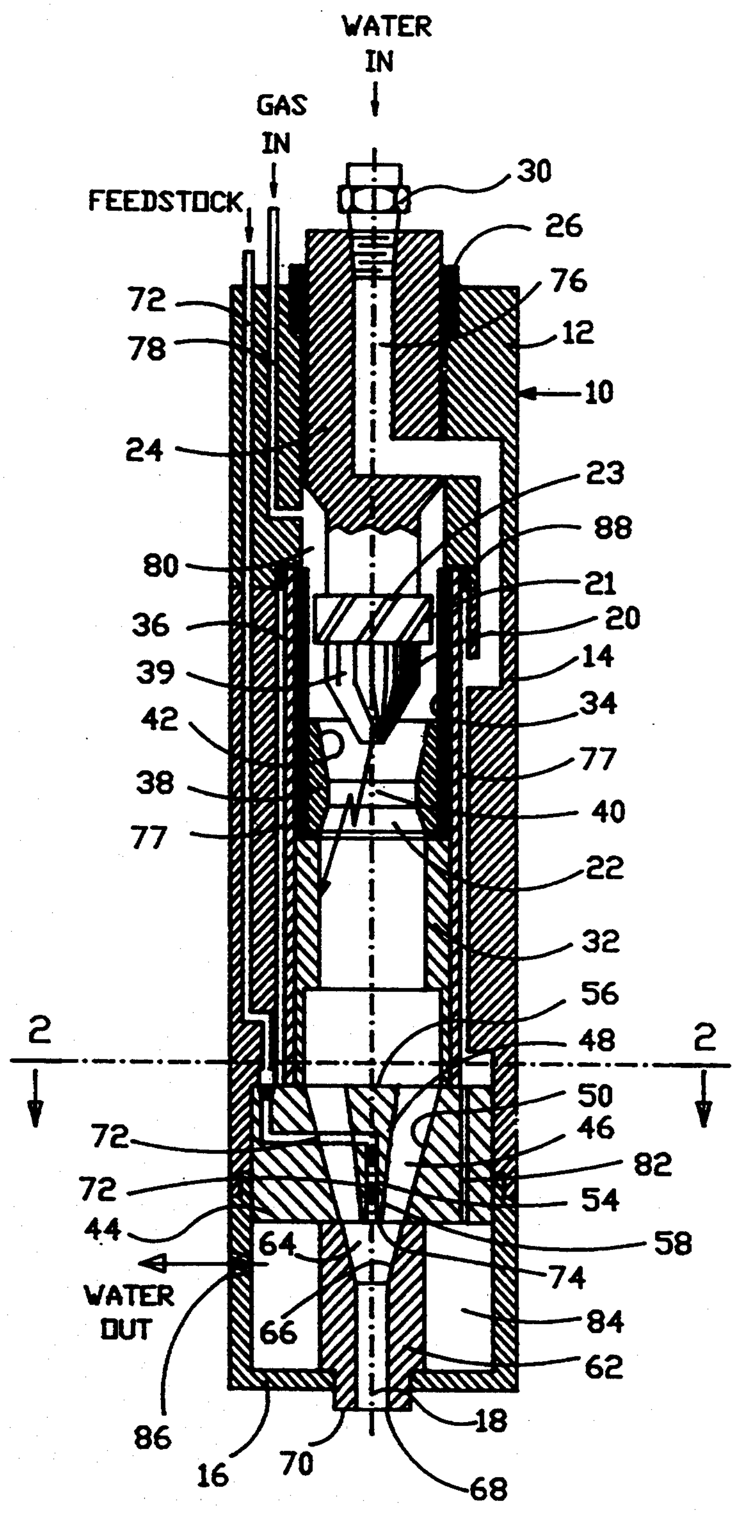
FIG. 1 is a schematic front elevation view of the plasma torch of the present invention, in cross-section.

Referring initially to FIG. 1 of the drawings, plasma torch 10 is shown, including upper, middle and lower housing members 12, 14 and 16, respectively, connected in longitudinal co-axial alignment about axis 18. Axis 18 defines a longitudinal axis of torch 10.

A centrally disposed, bullet-shaped cathode 20 extends into arc forming chamber 22 and is connected to upper member 12 by means of cathode support 24 insulated from upper member 12 by means of insulator 26. Cathode 20 is of a refractory metal, preferably tungsten, with 1–3% thoria. Cathode mount 24 is preferably of high thermal conductive metal, preferably copper. Electrical lead 30 is connected to cathode support 24 to provide negative bias to cathode 20. Electrical lead 30 has a hollow shape to allow the flow of cooling agent into the torch and may comprise a pipe fitting. Cathode 20 is generally symmetrical about axis 18. Cathode 20 includes cathode support 21 and cathode tip 39.

Optionally, cathode support 21 may be machined on its outer surface with grooves 23 offset laterally from the upstream and downstream ends of the grooves 23, about the surface of support 21 as shown in FIG. 1. Grooves 23 cause plasma gases in the chamber 22 to form a vortex within chamber 22. This provides a superior cooling of the plasma gas stream by increased contact with the cool chamber wall, further increasing plasma resistivity and therefore the voltage, generally providing more efficient torch 10 functioning.

Anode 32 is of annular shape connected to the outer walls of a lower or downstream portion of chamber 22. Chamber 22 has an insulating inner wall 34 extending from the upstream extremity adjacent the cathode 20, to the anode 32, to prevent arcing between cathode 20 and chamber wall 36, and generally to confine the arc between cathode 20 and anode 32.

As a preferred option, a section of chamber 22 between cathode 20 and anode 32 may include annular protrusion 38 extending about chamber walls 36. Annular protrusion 38 defines a narrower opening region 40 of chamber 22 which causes an increase in plasma gas velocity flowing through chamber 22. The higher velocity plasma gas causes an increase in electrical resistivity and higher arc voltage. Increasing arc voltage results in higher efficiency of the plasma torch. While the use of annular protrusion 38 to increase voltage is highly beneficial, the annular protrusion 38 design is not necessary for efficient functioning of a plasma torch with axial feed of feedstock. The insulating wall 34 may extend from the upstream extremity of chamber 22 to the annular protrusion 38 to facilitate the ignition of the arc on the protrusion 38, in which case the protrusion 38 is at the same potential as the anode 32. Electrical contact is provided by the chamber wall 36 which is a metallic sleeve surrounding the chamber 22.

Preferably, region 40 has a length (that is, a distance along the longitudinal axis 18 of the torch) of between 0.5 inches and 1.5 inches, with a most preferred length of about 0.7 inches. Preferably, the internal diameter of region 40 is between 0.15 inches and 0.3 inches with a most preferred diameter of 0.25 inches. Preferably, the taper angle of the protrusion 38 (that is, the angle between walls 42 of protrusion 38 and walls 36 of chamber 22) is between 30° and 60° with a most preferred angle of 45°.

The chamber 22 is located in the middle housing member 14 and is spaced from it by means of gasket or O-ring 88. The chamber wall 36 and the inner wall of middle housing member 14 define an annular space through which water is circulated to cool the wall of chamber 22. The gasket 88 also prevents water from penetrating into chamber 22.

Figure 3:
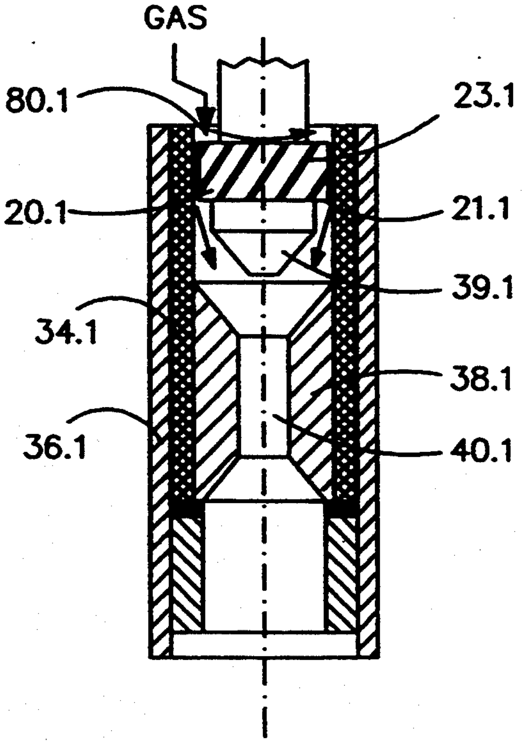
FIG. 3 is a schematic front elevation view of a chamber of the present invention, in cross-section.

Referring to FIG. 3, an alternate embodiment of chamber 30.1 is shown, having annular protrusion 38.1 between cathode 20.1 and annular anode 32.1. Wall 36.1 extends about chamber 38.1 and is preferably made of copper and extends the full length of chamber 38.1. Narrow region 40.1 is of much smaller cross-section as compared to narrow region 40 of FIG. 1, thereby causing a corresponding increase in velocity and resultant increased electrical resistivity and higher arc voltage, as compared to the torch of FIG. 1.

Referring back to FIG. 1, splitter 44 is connected to a lower portion of middle housing member 14 adjacent and downstream of anode 32. Splitter 44 includes a pair of generally kidney-shaped splitting channels 46, seen best in FIG. 2.

Figure 2:
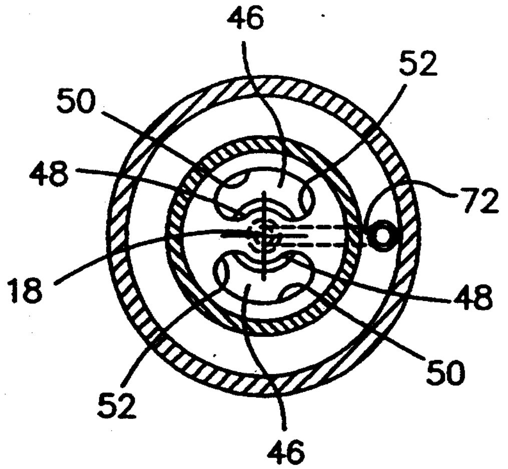
FIG. 2 is a plan view of a section taken along line 2—2 of FIG. 1.

Referring to FIG. 2, channels 46 include inner and outer path defining surfaces or walls, 48 and 50, respectively. Inner and outer walls are generally coaxial about axis 18, as are chambers 46. A pair of opposed channel walls 52 are formed between adjacent ends of respective channels 46.

Core 54 is disposed in an interior region of, and is substantially surrounded by, channels 46. Core 54 is connected to splitter 44 by means of channel walls 52.

Referring to FIG. 1, core 54 has a perpendicular upper or upstream end wall 56 and cone-shaped wall 58 extending to apex 60 at a downstream end. Inner surfaces 48 and outer surfaces 50 converge in the direction of the downstream end with the downstream end of inner and outer surfaces 48 and 50 being closer together than their upstream ends. Surfaces 48 and 50 thereby cause some convergence of the plasma stream passing through channels 46.

Nozzle 62 is connected to lower housing 16 at a downstream end and is connected with splitter 44 at an upstream end. Nozzle 62 includes conically-shaped converging section opening 64 having a surface 66. Wall 66 merges with outer surfaces 50 of channels 46. The lower downstream end of converging section 64 is connected to tubular shaped nozzle passage 68. Nozzle passage 68 forms extension 70 extending beyond the downstream end of middle housing member 14.

The upstream ends of outer surfaces 50 merge smoothly with the outer annular surface of anode 32.

Feedstock tube 72 extends from a feedstock source (not shown) into torch 10 through upper and middle housing members 12 and 14, respectively. Feedstock tube 72 extends into splitter 44 and bends inwardly in a direction towards axis 18. Referring to FIGS. 1 and 2, feedstock tube 72 extends through one of the core walls 58 into core 54. As seen best in FIG. 1, tube 72 extends to axis 18 and then bends downwardly or in a downstream direction along axis 18 to merge with apex 60 at its outlet end 74. It can be seen that outlet end 74 is oriented to direct feedstock in tube 72 into converging section 64 in a downstream direction.

The cooling of torch 10 is undertaken through circulation of water and water tube 76 extends through an internal region of cathode support 24 along axis 18. Tube 76 is bent laterally at a mid-region of support 24 and extends outwardly into upper housing member 12. Tube 76 is then bent downwardly in a downstream direction and extends into middle housing member 14. Tube 76 is then bent inwardly and opens to water jacket 77 extending about chamber walls 36 between middle housing member 14 and chamber walls 36 to cool chamber walls 36. The downstream or lower end of water jackets 77 are connected to lower water tubes 82 which are, in turn, connected at their downstream end to water reservoir 84. Water reservoir includes opening 86 for the exit of water from torch 10 to be discarded or to be cooled and re-circulated into the input end of water tube 76. Alternatively, water reservoir 84 may be connected to middle housing member 14 and upper housing member 12 through appropriate water channels in splitter 44 in order to permit water at the rear of the torch to exit.

In order to generate a plasma stream, inert plasma gas flow must be supplied within chamber 22. Gas supply tube 78 is connected to a gas supply (not shown) at one end, preferably containing inert argon gas. Supply tube 78 extends in an axial direction downstream within upper housing member 12 and is then bent inwardly into upper region 80 of chamber 22. Upper region 80 extends radially about support 24 and gas entering region 80 from tube 78 extend about support 24. Upper region 80 connects with chamber 22 to provide gas into the arc generating region between cathode 20 and anode 32 and to propel the generated plasma gas stream downstream in a direction from the cathode to the anode toward splitter 44.

Figure 4:
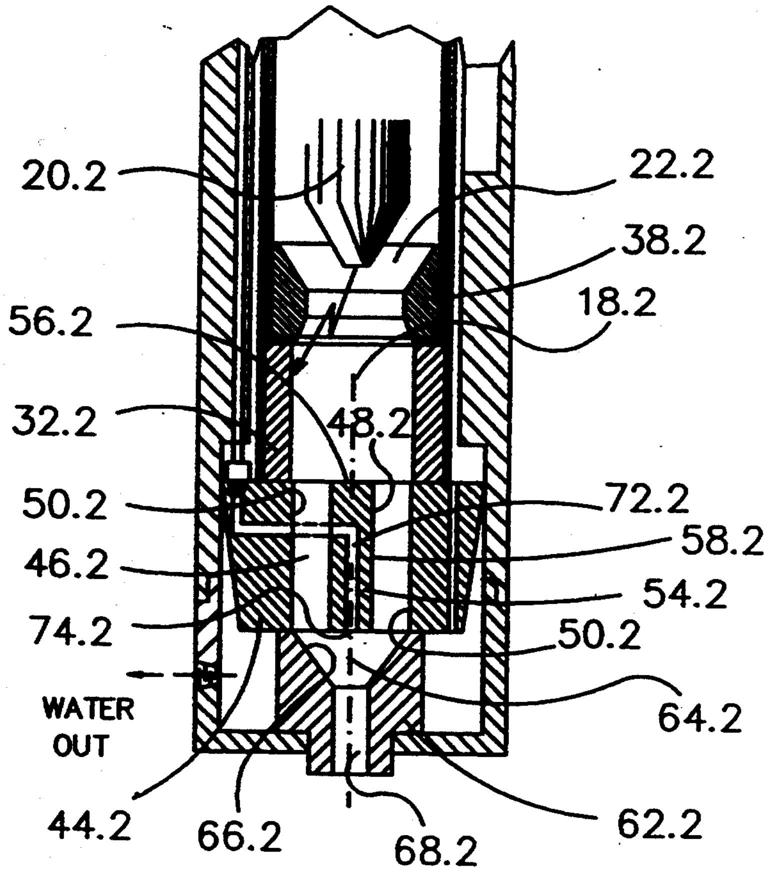
FIG. 4 is a schematic front elevation view of a portion of the plasma torch showing an alternate embodiment of the core region, in cross section.

Referring now to FIG. 4, an alternate embodiment of torch 10 which includes splitter 44.2 is shown in conjunction with chamber 22.2 and nozzle 62.2. References to the embodiment depicted in FIG. 4 have the designation "0.2" and it should be understood that those references correspond to corresponding designated numerical reference component shown in FIG. 1 and described above, except as may be modified in this paragraph. Splitter 44.2 includes core 54.2 having a perpendicular core end wall 56.2 similar to end wall 56 depicted in FIG. 1. However, core 54.2 has core walls 58.2 which are tubular in shape about axis 18.2. Core walls 58.2 are parallel with one another. As well, inner and outer path defining surfaces for walls, 48.2 and 50.2, respectively, are parallel with one another, forming non-converging channels 46.2. Outer walls 50.2 merge generally with the inner wall of anode 32.2. Due to the non-convergence of channels 46.2, nozzle 62.2 includes converging section 64.2 of larger diameter as compared to converging section 64 of FIG. 1. As before, however, outer walls 50.2 merge with surface 66.2 at an upstream end of surface 66 and merge with nozzle passage 68.2 at its downstream end.

Figure 5:
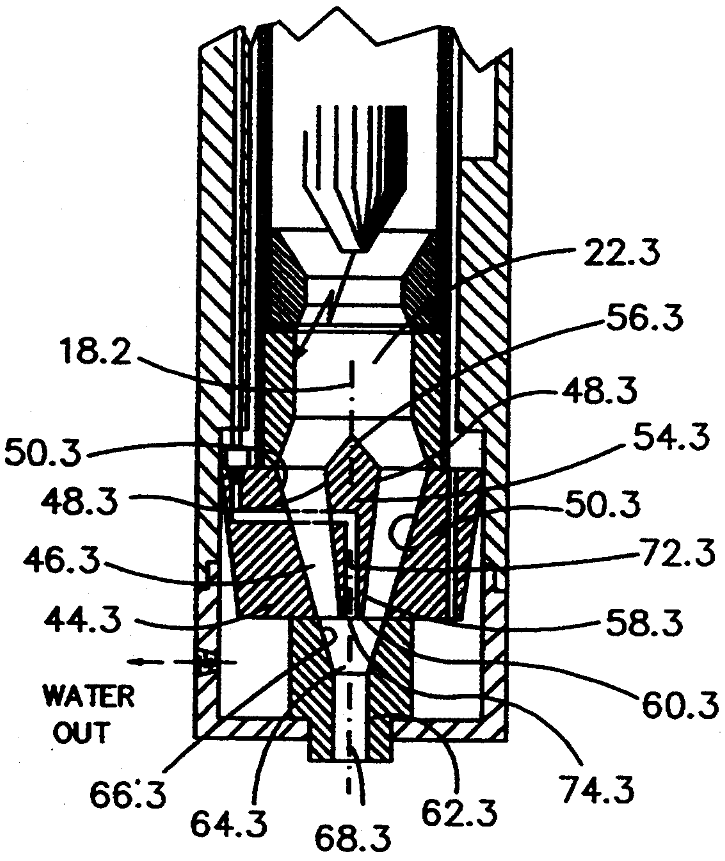
FIG. 5 is a schematic front elevation view of a portion of the plasma torch showing a further alternate embodiment of the core region, in cross-section.

Referring now to FIG. 5, a further alternate embodiment of torch 10 is shown with splitter 44.3 in conjunction with chamber 22.3 and nozzle 62.3. In FIG. 5, the numerical references include the designation "0.3" and it should be understood that those references correspond to corresponding designated numerical references contained in FIG. 1, and described above, except as may be modified in this paragraph. Splitter 44.3 includes core 54.3 having core end wall 56.3 of a generally conical shape located at an upstream end of core 54.3. Core 54.3 is generally cone-shaped; core walls 58.3 with an apex 60.3 at its downstream end. Inner and outer path defining surfaces or walls 48.3 and 50.3, respectively, converge from the upstream end to the downstream end with a smaller opening of channels 46.3 at the downstream end as compared to the upstream end of channels 46.3 As before, nozzle 62.3 includes converging section 64.3 having surface 66.3 which is cone-shaped and which merges with outer walls 50.3 at an upstream end and with walls of nozzle passage 68.3 at a downstream end.

OPERATION

The operation of torch 10 will now be described with reference to FIGS. 1 and 2.

Cooling water is circulated through the torch.

A plasma gas, usually argon, is supplied from any outside source through tube 78 travelling through the upper housing member 12 and opening in the upper region 80 where it passes cathode 20. The plasma gas is then ejected at high velocity and preferably swirled (by grooves machined on the outer surface of cathode support 21) into the portion of the chamber 22 between the cathode tip 39 and the anode 32. The plasma gas is then split by splitter 44 into a plurality of streams passing through chamber 46. The plurality of streams are converged into a unitary stream by converging section 64 and is ejected to atmosphere through nozzle 62.

A bias voltage of generally 100–400 V is supplied by an external power supply. Negative voltage is applied to the cathode, by means of contact 30.

Positive voltage is applied to the anode 32 through the chamber 22 outer wall and the middle and lower housing members and 14 and 16 respectively, to which the outer wall is in electrical contact. The connection to the power supply may be made generally in the same manner as the cathode connection, using the water outlet 84 and a pipe fitting to which an electrical cable is solidly attached. Generally, the upper housing member 12 is made of an electrically insulating material providing insulation for cathode support 24. A high voltage spark of 8 to 20 KV is superimposed over the bias voltage supplied by the outside external supply. If the protrusion 58 is at neutral potential, the high voltage spark occurs between the cathode tip 20 and the anode 32 inner surface. If the protrusion 38 is at the same bias with anode 32, the arc is first established between the cathode tip 20 and the protrusion 38 inner wall. Due to the high gas velocity in the protrusion, the arc is pushed forward and forced to jump and attach to the anode 32 inner surface. This creates an extended arc, resulting in increased arc voltage, which heats the plasma gas to the desired temperature.

After arc ignition, secondary gases are usually fed into the plasma gas to increase plasma enthalpy and thermal conductivity. Preferred secondary gases are hydrogen, nitrogen and helium. The nature and percentage of secondary gases is determined by the spray recipe specific for each feedstock such as to achieve the desired degree of melting.

After the desired plasma gas composition and power level is established, feedstock is supplied from an external source through tube 72. If in solid or powder form, the feedstock is generally carded by means of a carrier gas. The feedstock travels through tube 72 into core 54 provided in splitter 44 and is injected axially into converging section 64 in a downstream direction. Further, the feedstock is entrained by the plasma jet which transfers heat and momentum to the feedstock. The molten feedstock is then impacted onto a surface to form a coating upon rapid solidification.

I claim:

1. A plasma torch having a longitudinal axis, comprising:

(a) a chamber having a wall;

(b) a plasma generator comprising a cathode and an anode disposed in the chamber for forming an electrical arc between the cathode and anode to generate a plasma stream in the chamber moving in the direction of the anode;

(c) a plurality of splitting channels connected to the chamber shaped to receive the plasma stream and split the stream into a plurality of streams, the splitting channels disposed substantially symmetrical about the longitudinal axis;

(d) a core located in an interior region of and substantially surrounded by the splitting channels;

(e) a converging section connected to the splitting channels shaped to merge the plurality of streams into a generally unitary stream; and (f) a feedstock input passage for directing feedstock into the unitary stream in the converging section in a direction co-axial with the longitudinal axis of the torch, the passage passing from the wall of the chamber to the core.

2. A torch as described in claim 1, further comprising a plurality of converging channels located between the splitting channel and the converging section, the core located in an interior region of and substantially surrounded by the splitting channels and the converging channels, the converging channels shaped to receive the plurality of streams and direct the plurality of streams inwardly toward the converging section.

3. A torch as defined in claim 2 wherein the splitting channels are shaped to direct the plurality of streams outwardly from the longitudinal axis of the torch and the converging channels are shaped to direct the plurality of streams inwardly toward the longitudinal axis of the torch.

4. A torch as described in claim 1 wherein each of the plurality of splitting channels further comprise a first path defining surface connected to the chamber at an upstream end, the path defining surfaces defining a splitting portion substantially co-axial with the longitudinal axis of the torch for splitting the plasma stream into the plurality streams.

5. A torch as described in claim 4 wherein each of the first path defining surfaces further comprises first inner and outer walls extending radially outward from the longitudinal axis of the torch.

6. A torch as described in claim 5 wherein the plurality of first inner and outer walls are generally coaxial with one another and wherein the first inner walls form the splitting portion at their upstream end.

7. A torch as described in claim 2 wherein each of the plurality of converging channels further comprise a second path defining surface, connected to a respective splitting channel at an upstream end shaped to receive a respective radial stream from its connected splitting channel and to direct the radial stream inwardly, each second path defining surface connected to the converging section at a downstream end.

8. A torch as described in claim 7 wherein each of the second path defining surface comprises second inner and outer walls extending radially inwardly toward the longitudinal axis of the torch.

9. A torch as described in claim 8 wherein the second inner and outer walls are generally coaxial with the longitudinal axis.

10. A torch as defined in claim 7 wherein the converging section comprises a third path defining surface connected to each of the second path defining surfaces at an upstream end of the third path defining surface shaped to direct each radial stream into the unitary stream.

11. A torch as described in claim 10 wherein the third path defining surfaces comprise third inner and outer walls, the third inner wall defining a cone apex at the downstream end of the core.

12. A torch as described in claim 10 wherein the third path defining surface merges with the second path defining surfaces.

13. A torch as described in claim 11 wherein the third inner wall is of generally conical shape with the feedstock input passage extending through the cone apex of the third inner wall.

14. A torch as described in claim 13 wherein the feedstock input passage comprises an outlet end extending through the apex for discharging the feedstock into the unitary stream.

15. A torch as described in claims 13 or 14 wherein the apex is substantially in linear alignment with the longitudinal axis of the chamber.

16. A torch as described in claim 2 wherein:

(a) each of the plurality of splitting channels comprise inner and outer splitting channel path defining surfaces; and (b) each of the plurality of converging channels comprise inner and outer converging channel path defining surfaces;

wherein the inner splitting channel path defining surfaces and inner converging channel path defining surfaces substantially define the core.

17. A torch as described in claim 2 wherein the converging channels are substantially symmetrical about the longitudinal axis of the torch.

18. A torch as described in claim 1 wherein the passage passes between adjacent splitting channels from the wall of the chamber to the core.

19. A torch as described in claim 2 wherein the passage passes between the converging channels from the wall of the chamber to the core.

20. A torch as described in claim 1 wherein the splitting channels are in co-axial alignment with the converging section.

21. A torch as described in claim 3 wherein the splitting channels are angled outwardly from the longitudinal axis of the torch.

22. A torch as described in claim 21 wherein the outward angle of the splitting channels is between 1° and 45°.

23. A torch as described in claim 1 wherein the core region is in co-axial alignment with the longitudinal axis of the torch.

24. A torch as described in claim 1 wherein the chamber further comprises an annular protrusion extending laterally into said chamber to form a narrower opening region in the chamber.

25. A torch as described in claim 24 wherein the longitudinal length of the protrusion in a region of maximum extension is between 0.5 of an inch and 1.5 inches.

26. A torch as described in claim 25 wherein the length is about 0.7 of an inch.

27. A torch as described in claim 24 wherein the internal diameter of the narrower opening region is between 0.15 of an inch and 0.3 of an inch.

28. A torch as described in claim 27 wherein the diameter of the narrower opening region is about 0.25 of an inch.

29. A torch as described in claim 24 wherein the protrusion comprises a protrusion wall connected to and offset at an angle from the wall of the chamber and wherein the angle between the protrusion wall and the wall of the chamber is between 30° and 60°.

30. A torch as described in claim 29 wherein the angle is about 45°.

31. A torch as described in claim 24 wherein the wall of the chamber comprises an insulating inner wall electrically insulating the interior of the chamber from the exterior of the chamber, the insulating wall extending from a region adjacent the cathode to a region adjacent the anode.

32. A torch as described in claim 24 wherein the wall of the chamber comprises an insulating inner wall insulating the interior of the chamber from the exterior of the chamber, the insulating wall extending from a region adjacent the cathode to a region adjacent the annular protrusion.

33. A torch as described in claim 1 wherein the splitting channel further comprises inner and outer path defining surfaces defining a plurality of symmetrical kidney-shaped channels separated by a plurality of channel walls and wherein the feedstock input passage passes through one or more of the inner walls from the walls of the chamber to the core.

34. A torch as described in claim 33 wherein the number of kidney-shaped channels is two and the number of channel walls is two.

35. A torch as described in claim 1 wherein the cathode comprises a grooved outer surface, the grooves offset laterally about the surface of the cathode.

36. A feedstock injector for a plasma torch having a longitudinal axis comprising:

(a) a plurality of splitting channels for connection to a plasma torch shaped to receive a plasma stream from the plasma torch and to split the stream into a plurality of streams the splitting channels disposed substantially symmetrically about the longitudinal axis;

(b) a core located in an interior region of and substantially surrounded by the splitting channels;

(c) a converging section connected to the splitting channels shaped to merge the plurality of streams into a generally unitary stream; and (d) a feedstock input passage for directing feedstock into the unitary stream in the converging region in a direction co-axial with the longitudinal axis of the torch, the passage passing through the core.

37. An injector as described in claim 36, further comprising a converging channels located between the splitting channels and the converging section, the core located in an interior region of and substantially surrounded by the splitting channels and the converging channels, the converging channels shaped to receive the plurality of streams and direct the plurality of streams inwardly toward the converging section.

38. An injector as defined in claim 37 wherein the splitting channels are shaped to direct the plasma stream outwardly from the longitudinal axis of the torch and the converging channels are shaped to direct the plurality of streams inwardly toward the longitudinal axis of the torch.

* * * * *

US005420391B1

REEXAMINATION CERTIFICATE (3542nd)

United States Patent [19] | [11] B1 5,420,391

Delcea | [45] Certificate Issued Jun. 9, 1998

[54] PLASMA TORCH WITH AXIAL INJECTION OF FEEDSTOCK

[75] Inventor: Lucian B. Delcea, Richmond, Canada

[73] Assignee: Metcon Services Ltd., Abbotsford, Canada

Reexamination Request:
No. 90/004.466, Nov. 22, 1996

Reexamination Certificate for:
Patent No.: 5,420,391
Issued: May 30, 1995
Appl. No.: 262,570
Filed: Jun. 20, 1994

[51] Int. Cl.[6] .................... B23K 10/00
[52] U.S. Cl. .................... 219/121.47; 219/121.51; 219/121.48; 219/76.16; 427/446
[58] Field of Search .................... 219/121.5, 121.48, 219/121.51, 121.52, 121.49, 121.47, 76.15, 76.16, 74, 75, 121.39, 121.59; 313/231.31, 231.41; 427/99, 535, 446, 447, 449, 569

[56] References Cited

U.S. PATENT DOCUMENTS

| | | | |
|---|---|---|---|
| 3,272,962 | 9/1966 | Mauskapf | 219/137 |
| 4,095,081 | 6/1978 | Ashman | 219/76.17 |
| 4,321,454 | 3/1982 | Willems et al. | 219/121.47 |
| 4,540,121 | 9/1985 | Browning | 239/13 |
| 4,780,591 | 10/1988 | Bernecki et al. | 219/121.52 |
| 4,982,067 | 1/1991 | Marantz et al. | 219/121.47 |
| 5,008,511 | 4/1991 | Ross | 219/121.48 |
| 5,144,110 | 9/1992 | Marantz et al. | 219/121.48 |
| 5,298,714 | 3/1994 | Szente et al. | 219/121.47 |
| 5,332,885 | 7/1994 | Landes | 219/121.47 |

*Primary Examiner*—Mark H. Paschall

[57] ABSTRACT

A plasma torch incorporating an arc forming a chamber in which a cathode cooperates with an anode to form a plasma arc. A splitter is connected to the arc forming chamber and comprises a plurality of passages arranged about a core region, the passages leading from the arc forming chamber into a nozzle passage extending along the axis of the arc forming chamber. A feed passage passes through the core region, opening co-axially with the longitudinal axis of the torch, in or about the region of coalescence of the plasma stream exciting the splitter passages. Feedstock material, such as powder, is fed through the feed passage into the coalesced plasma stream in an axial direction and in its direction of travel.

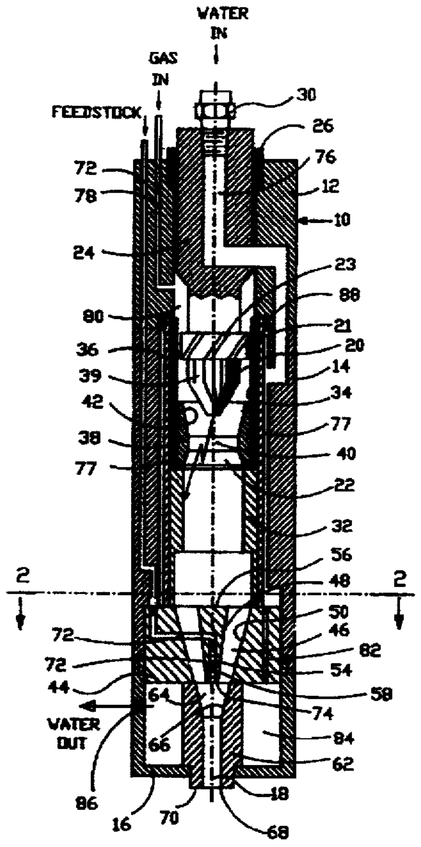

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claim 1 and 36 are determined to be patentable as amended.

Claims 2–35, 37 and 38, dependent on an amended claim, are determined to be patentable.

New claim 39 is added and determined to be patentable.

1. A plasma torch having a longitudinal axis, comprising:

(a) a chamber having a wall;

(b) a plasma generator comprising a cathode and an anode disposed in the chamber for forming an electrical arc between the cathode and anode to generate a plasma stream in the chamber moving in the direction of the anode;

(c) a plurality of splitting channels connected to the chamber *each of the channels comprising an upstream end in substantial coplanar alignment with each other and* shaped to receive the plasma stream and split the stream *only at the region of contact with the upstream end of the splitting channels* into a plurality of streams, the splitting channels disposed substantially symmetrical about the longitudinal axis;

(d) a core located in an interior region of and substantially surrounded by the splitting channels;

(e) a converging section connected to the downstream ends of the splitting channels and shaped to merge the plurality of streams into a generally unitary stream; and (f) a feedstock input passage for directing feedstock into the unitary stream in the converging section in a direction coaxial with the longitudinal axis of the torch, the passage passing from the wall of the chamber to the core.

36. A feedstock injector for a plasma torch having a longitudinal axis comprising:

(a) a plurality of splitting channels for connection to a plasma torch *each of the channels comprising an upstream end in substantial coplanar alignment with each other and* shaped to receive a plasma stream from the plasma torch and to split the stream *only at the region of contact with the upstream end of the splitting channels* into a plurality of streams, the splitting channels disposed substantially symmetrically about the longitudinal axis;

(b) a core located in an interior region of and substantially surrounded by the splitting channels;

(c) a converging section connected to the splitting channels shaped to merge the plurality of streams into a generally unitary stream; and (d) a feedstock input passage for directing feedstock into the unitary stream in the converging region in a direction coaxial with the longitudinal axis of the torch, the passage passing through the core.

*39. A plasma torch as described in claim 1, wherein the cathode and anode are disposed substantially along the longitudinal axis.*

* * * * *